US010279718B2

(12) United States Patent
Hayashi et al.

(10) Patent No.: US 10,279,718 B2
(45) Date of Patent: May 7, 2019

(54) VEHICLE HEADREST

(71) Applicant: TOYOTA BOSHOKU KABUSHIKI KAISHA, Aichi-ken (JP)

(72) Inventors: Koji Hayashi, Aichi-ken (JP); Hisaya Mori, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/885,248

(22) Filed: Jan. 31, 2018

(65) Prior Publication Data

US 2018/0251055 A1 Sep. 6, 2018

(30) Foreign Application Priority Data

Mar. 1, 2017 (JP) ................................. 2017-038217

(51) Int. Cl.
*B60N 2/885* (2018.01)
*B60N 2/806* (2018.01)
*A47C 7/38* (2006.01)

(52) U.S. Cl.
CPC ................ *B60N 2/885* (2018.02); *A47C 7/38* (2013.01); *B60N 2/806* (2018.02)

(58) Field of Classification Search
CPC ................................ B60N 2/885; B60N 2/806
See application file for complete search history.

(56) References Cited

U.S. PATENT DOCUMENTS

2004/0217639 A1 11/2004 Clough
2005/0006941 A1* 1/2005 Park ...................... B60N 2/856 297/406
2005/0121963 A1* 6/2005 Williamson ....... B60N 2/01508 297/408
2006/0131947 A1 6/2006 List et al.
2010/0141008 A1 6/2010 Augade et al.
(Continued)

FOREIGN PATENT DOCUMENTS

DE 10317036 6/2004
DE 102007039063 2/2009
(Continued)

OTHER PUBLICATIONS

German Office Action of German Patent Application 102018202865.6 dated Jul. 23, 2018, along with English-language translation.

*Primary Examiner* — Timothy J Brindley
(74) *Attorney, Agent, or Firm* — Greenblum & Bernstein, P.L.C.

(57) ABSTRACT

A vehicle headrest including: a main portion; at least one side portion; a base configured to support the main portion; and a pressure receiving operation mechanism configured to operate so as to push the main portion rearward from an initial position to a retraction position with respect to the base in response to load input by a head which leans on the main portion, wherein the pressure receiving operation mechanism includes a pushing mechanism portion configured to push the at least one side portion forward from an initial position to a side support position with respect to the base according to a moving amount of the main portion being pushed to the retraction position, the side support position being a position at which the head of the seated person is capable of being supported by the at least one side portion from a lateral side thereof.

8 Claims, 9 Drawing Sheets

(56) References Cited

U.S. PATENT DOCUMENTS

| | | | | |
|---|---|---|---|---|
| 2012/0080923 | A1 | 4/2012 | Kunert et al. | |
| 2017/0253153 | A1* | 9/2017 | Kapusky | B60N 2/853 |
| 2018/0050803 | A1* | 2/2018 | Le | B60R 7/005 |
| 2018/0105087 | A1* | 4/2018 | Novin | B64D 11/0642 |

FOREIGN PATENT DOCUMENTS

| | | | | | |
|---|---|---|---|---|---|
| DE | 102007041995 | | | 3/2009 | |
| DE | 102010062575 | | | 5/2012 | |
| DE | 102013001336 | | | 7/2014 | |
| JP | 2006123722 | A | * | 5/2006 | B60N 2/885 |
| JP | 2010-512278 | | | 4/2010 | |
| JP | 2010234910 | A | * | 10/2010 | B60N 2/4235 |

* cited by examiner

VEHICLE HEADREST

CROSS-REFERENCE TO RELATED APPLICATIONS

This application claims priority from Japanese Patent Application No. 2017-038217 filed on Mar. 1, 2017, the entire contents of which are incorporated herein by reference.

TECHNICAL FIELD

The disclosure relates to a vehicle headrest, and particularly to a vehicle headrest including a main portion including a central part of a front surface of the headrest and a side portion forming a side part of the front surface of the headrest.

BACKGROUND

In a vehicle seat, there has been known that a headrest for supporting a head of a seated person from a rear side thereof has a side support portion which can also support the head of the seated person from lateral sides thereof (see JP-A-2010-512278). The side support portion is coupled to a side of the main portion for supporting the head of the seated person from the rear side thereof in a form of being hinge-rotated forward and brought to a state where the head of the seated person can be supported from a lateral side thereof. The headrest is configured to include the side support portion, and thus the headrest can support the head of the seated person in a form of wrapping the head from the rear side thereof to the lateral side thereof.

In the prior art, it is necessary to manually perform the operation of hinge-rotating the side support portion forward, which is troublesome. However, in order to electrically perform the above operation, a large configuration such as a driving source is required, so that the entire structure may become complicated.

SUMMARY

The disclosure has been made to solve the above problem, and the problem to be solved by the disclosure is to provide a side support portion which can be easily switched to a state where the head of the seated person can be supported from lateral sides thereof through a simple configuration without using power means in a vehicle headrest.

According to an aspect of the disclosure, there is provided a vehicle headrest including: a main portion including a central part of a front surface of the headrest; at least one side portion including a side part of the front surface of the headrest; a base configured to support the main portion; and a pressure receiving operation mechanism configured to operate so as to push the main portion rearward from an initial position to a retraction position with respect to the base in response to load input by a head of a seated person which leans on the main portion from a front side thereof, wherein the pressure receiving operation mechanism includes a pushing mechanism portion configured to push the at least one side portion forward from an initial position to a side support position with respect to the base according to a moving amount of the main portion being pushed to the retraction position, the side support position being a position at which the head of the seated person is capable of being supported by the at least one side portion from a lateral side thereof.

DETAILED DESCRIPTION

Hereinafter, modes for carrying out the disclosure will be described with reference to the drawings.

Embodiment 1

<Schematic Configuration of Headrest 1>

Figure 1:
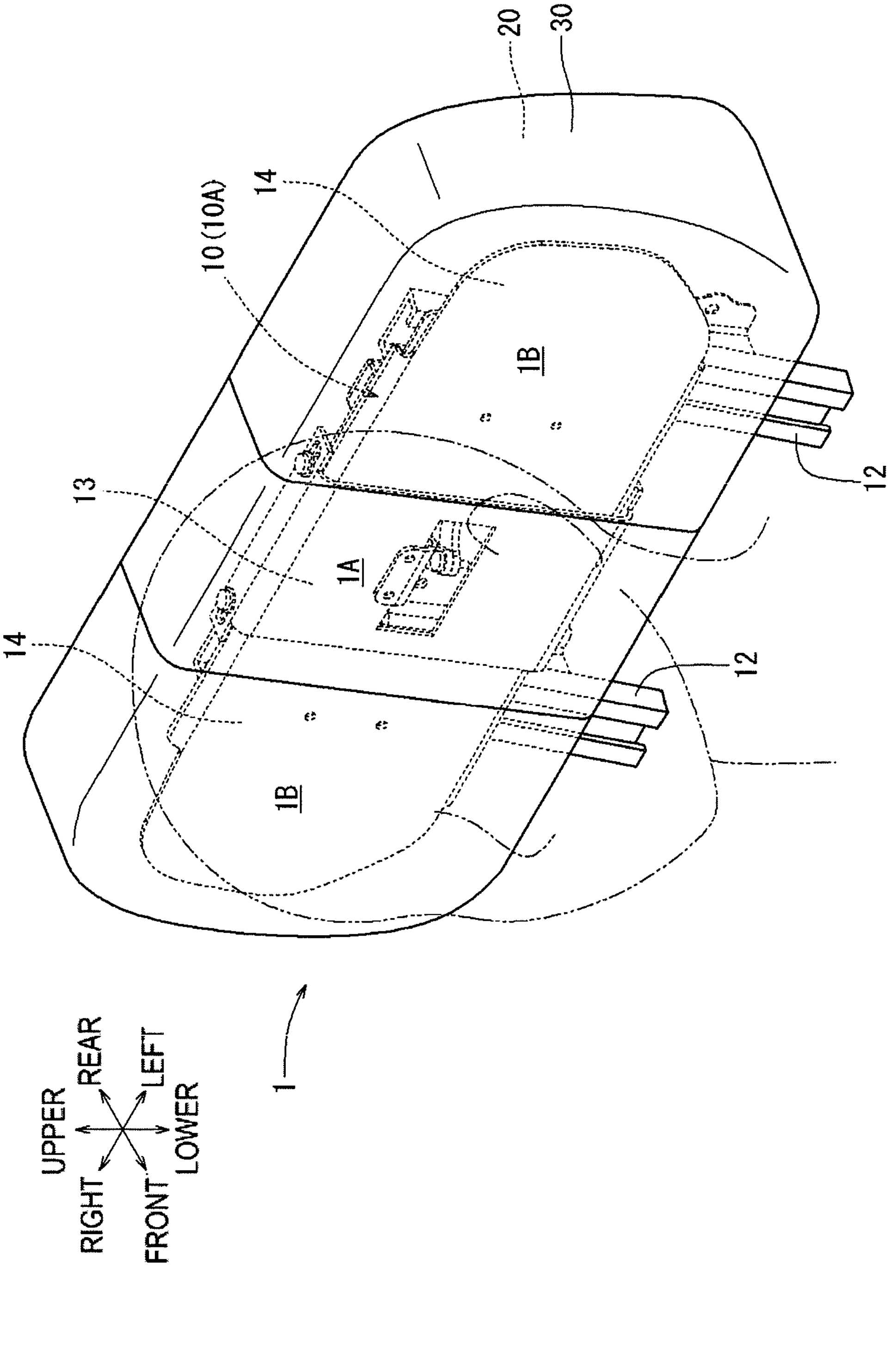
FIG. 1 is a perspective view showing a schematic configuration of a headrest according to Embodiment 1.

First, a configuration of a headrest 1 according to Embodiment 1 will be described with reference to FIGS. 1 to 9. Incidentally, in the following description, each direction such as front, rear, upper, lower, left, and right directions refer to directions shown in each drawing. As shown in FIG. 1, the headrest 1 of the present embodiment is configured as a head-rest portion of a seat (not shown) of an automobile.

Specifically, the headrest 1 is provided to be mounted on an upper portion of a seatback of the seat (not shown). The headrest 1 is configured to include a main portion IA which includes a central part of a front surface of the headrest 1 and side portions 1B which are located on both left and right sides of the main portion 1A and include side parts of the front surface of the headrest 1. The headrest 1 is configured such that the main portion 1A and each side portion 1B are kept in a state of forming a substantially flush front surface in an initial state of the headrest 1. With the above configuration, even if a light load is applied, such as the head of the seated person temporarily abutting against the main portion 1A or each side portion 1B from a front side thereof, the headrest 1 can support the head of the seated person from a rear side thereof at the initial position.

Figure 2:
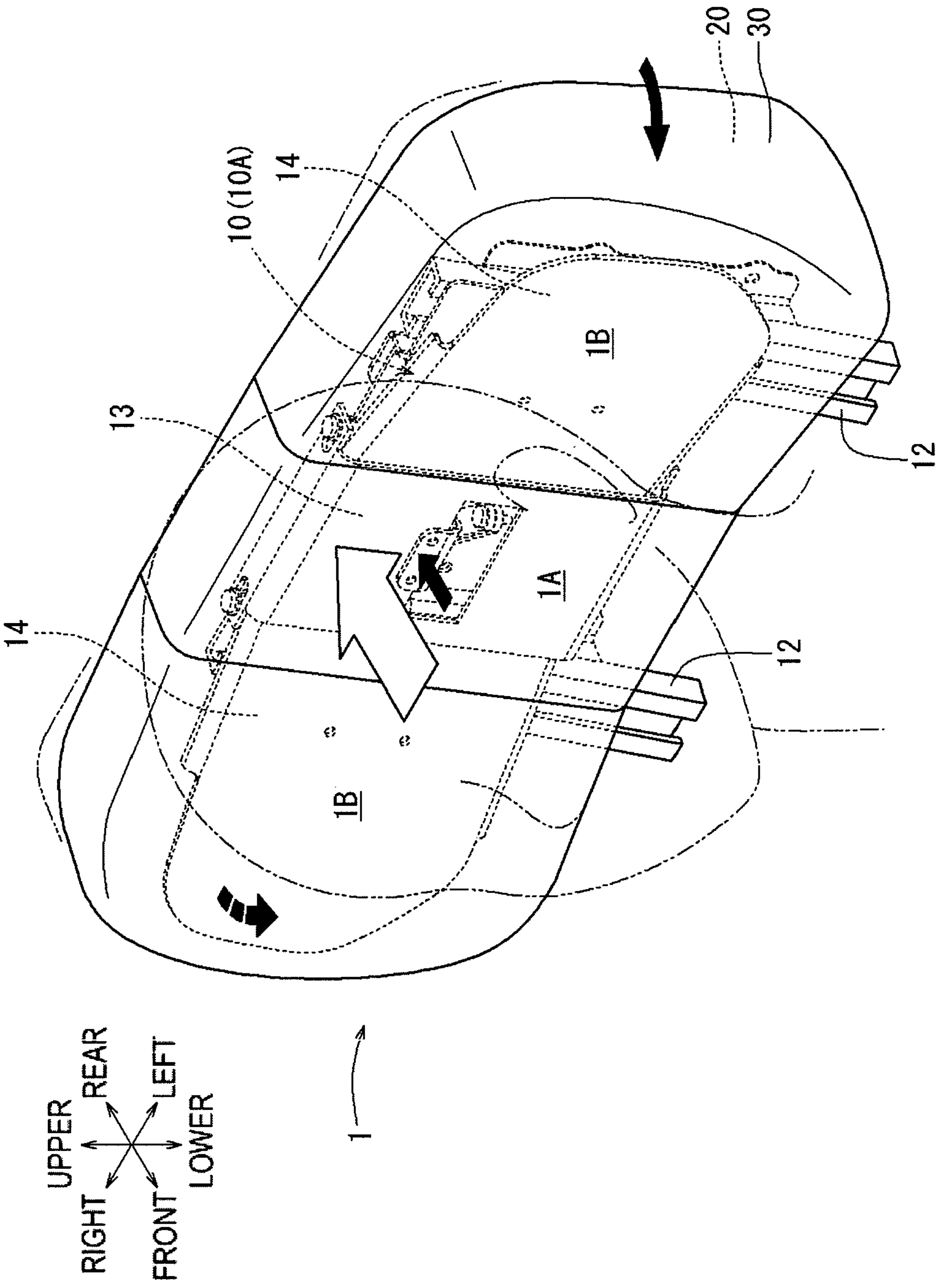
FIG. 2 is a perspective view showing a state where a head rests on the headrest.
Figure 3:
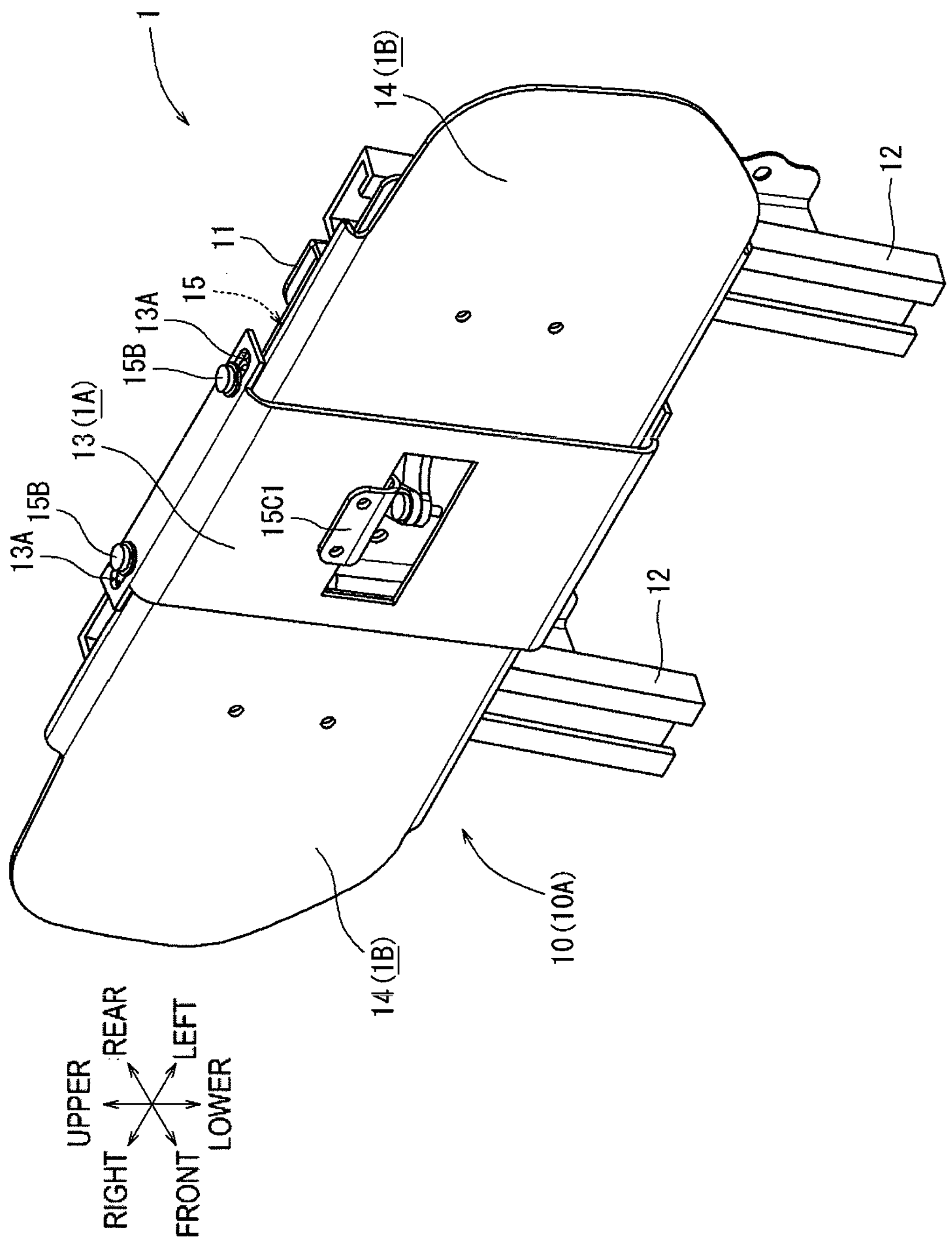
FIG. 3 is a perspective view of a framework structure of the headrest when viewed from a front side thereof.
Figure 4:
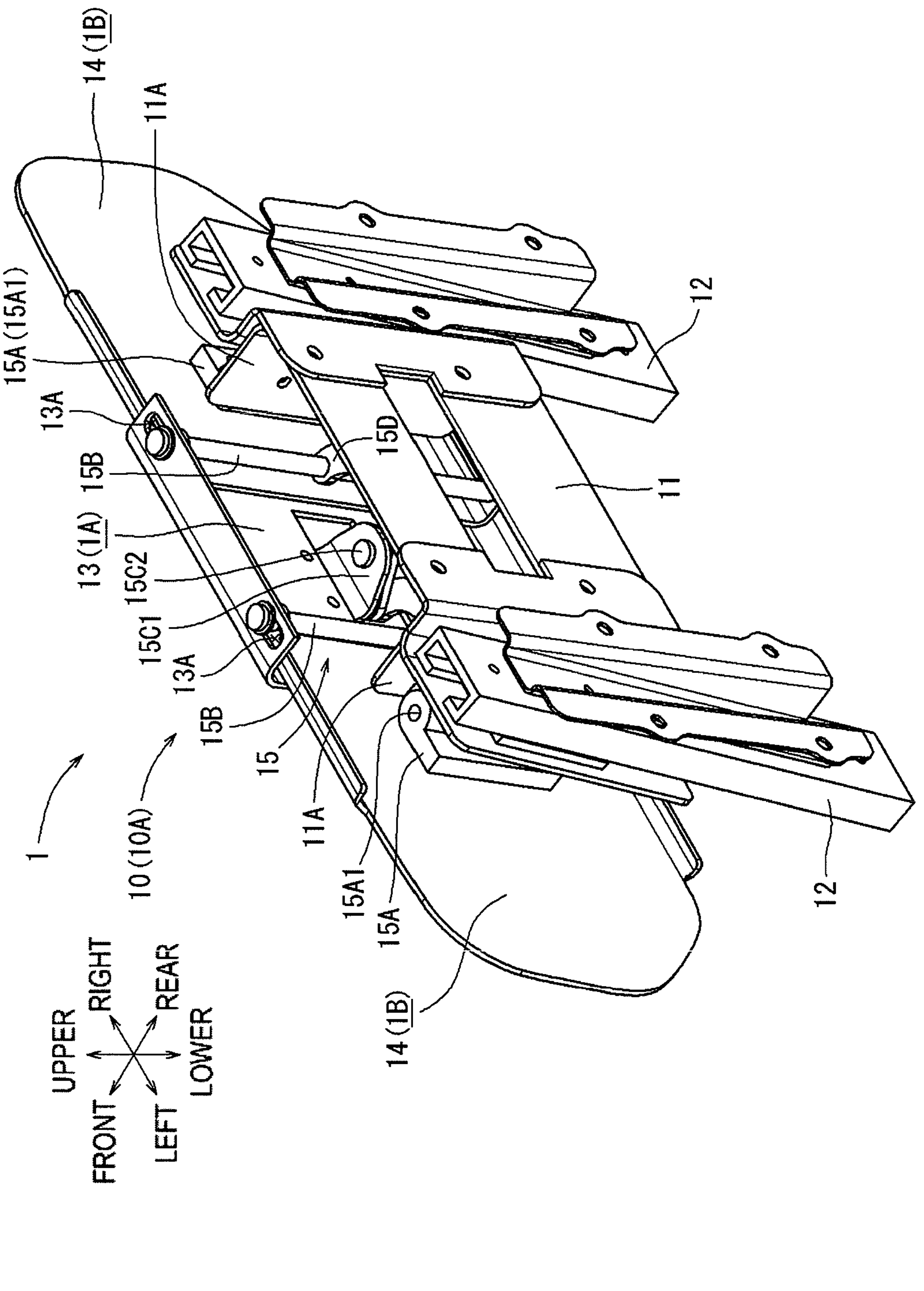
FIG. 4 is a perspective view of the framework structure of the headrest when viewed from a rear side thereof.
Figure 5:
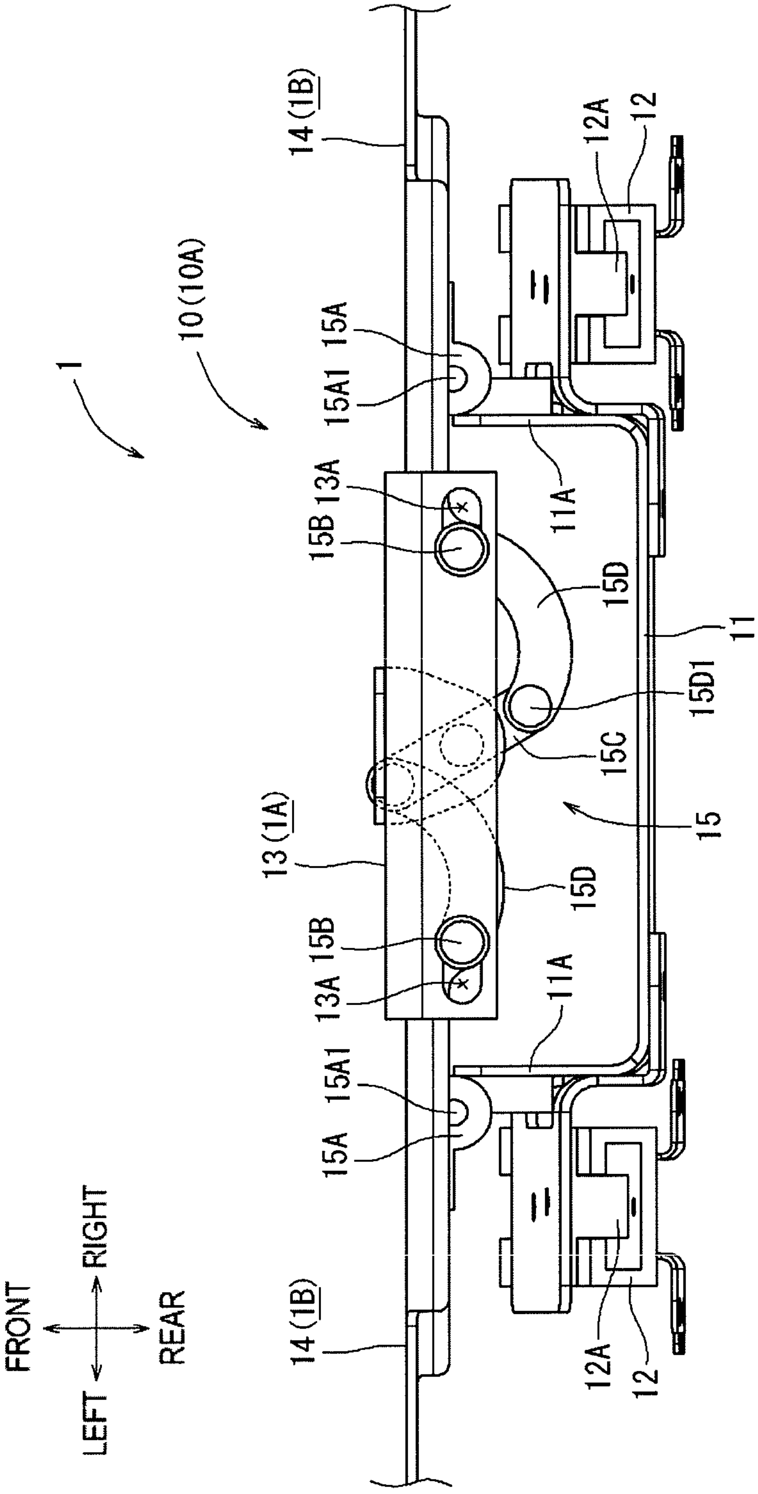
FIG. 5 is a plan view of the framework structure of the headrest when viewed from au upper side thereof.

However, as shown in FIG. 2, in response to a relatively heavy load being applied, such as the head of the seated person continuously leaning on the main portion 1A from the front side thereof, the main portion 1A of the headrest 1 is pushed to a retraction position from the initial position, and each side portion 1B is switched to an obliquely protruding state (side support state) where the head of the seated person can be supported laterally.

Specifically, the headrest 1 is configured such that a urethane foam-made pad 20 which can elastically receive the load of the head of the seated person is set on a front surface part of a metal internal frame 10 forming a framework of the headrest 1, and a fabric cover 30 configuring a design surface of the headrest 1 is further covered to the pad 20 so as to cover the entire surface thereof. Further, the headrest 1 is configured to be provided with a pressure receiving operation mechanism 10A which which operates so as to push the main portion 1A rearward from the initial position to the retraction position while causing each side portion 1B to protrude obliquely forward in response to the load, such as the head of the seated person continuously leaning on the main portion 1A from the front side thereof, being input to the internal frame 10 of the headrest 1. Hereinafter, a specific configuration of the internal frame 10 will be described in detail.

<Internal Frame 10>

That is, as shown in FIGS. 3 to 6, the internal frame 10 has a vertical plate-shaped base 11 having a surface facing the front side and serving as a base of the internal frame 10, a pair of left and right slide rails 12 which are assembled to the base 11 and support the base 11 in a state where the base 11 is slidable in the height direction, a substantially flat plate-shaped main plate portion 13 which is assembled to a front portion of the base 11 and forms a strength member inside the main portion 1A of the headrest 1, a pair of left and right substantially flat plate-shaped side plate portions 14 which are assembled to the left and right sides of the main plate portion 13 and form strength members inside the side portions 1B of the headrest 1, and a pushing mechanism portion 15 for pushing each side plate portion 14 to obliquely protrude forward according to movement in which the main plate portion 13 is pushed rearward.

The base 11 is configured such that lateral plate portions 11A bent in a form of protruding forward are formed on both left and right side portions of a substantially flat plate-shaped metal plate having a surface facing the front side. The pair of left and right slide rails 12 has a rail shape extending straightly in the height direction separately, and is configured such that a slider 12A is assembled slidably in the height direction with respect to the slide rail 12. Each slider 12A is integrally attached to a back surface portion of the base 11 and can be freely adjusted by applying force from the outside to move a height position of the slider 12A with respect to the slide rail 12. In a free state, each slider 12A is kept in a state where movement thereof in a gravitational direction with respect to the slide rail 12 is locked by resistance force due to sliding friction with respect to the slide rail 12.

The main plate portion 13 is formed of a substantially flat plate-shaped metal plate with a surface towards the front side. Bent pieces protruding in a flange shape towards the rear side thereof are formed at both upper and lower edges of the main plate portion 13, and elongated holes 13A extending straightly in the width direction are formed at both left and right edges of the bent pieces in a form of penetrating in the height direction.

Each side plate portion 14 is formed of a substantially flat plate-shaped metal plate having a surface facing the front side. The side plate portions 14 are configured in a state where back surface portions of middle parts in the width direction thereof are separately hinge-coupled to outer surface portions of the lateral plate portions 11A of the base 11 rotatably by a pair of left and right rotation hinges 15A configuring the pushing mechanism portion 15 which will be described later. Each rotation hinge 15A is in a state where each side plate portion 14 is hinge-coupled to each lateral plate portion 11A of the base 11 rotatably in a front and rear direction around each rotation shaft 15A1 which directs an axis thereof in the height direction. Here, the rotation hinge 15A corresponds to the "hinge-coupling portion" of the disclosure.

Furthermore, each side plate portion 14 is in a state where upper and lower portions of inner edges thereof in the width direction are hinge-coupled to a pair of upper and lower elongated holes 13A, which is formed in left and right edges of the main plate portion 13, rotatably and slidably in the width direction by a pair of left and right slide shafts 15B which direct axes thereof in the height direction and configure the pushing mechanism portion 15 which will be described later. In a free state, each side plate portion 14 is kept in a state where rotation thereof in the front and rear direction with respect to each lateral plate portion 11A of the base 11 is stopped by sliding friction resistance force set in each rotation hinge 15A. The position of each side plate portion 14 is kept by each rotation hinge 15A, so that a position of the main plate portion 13, which is coupled between the side plate portions 14 via the slide shafts 15B, in a free state is also kept in a stopped state.

Figure 6:
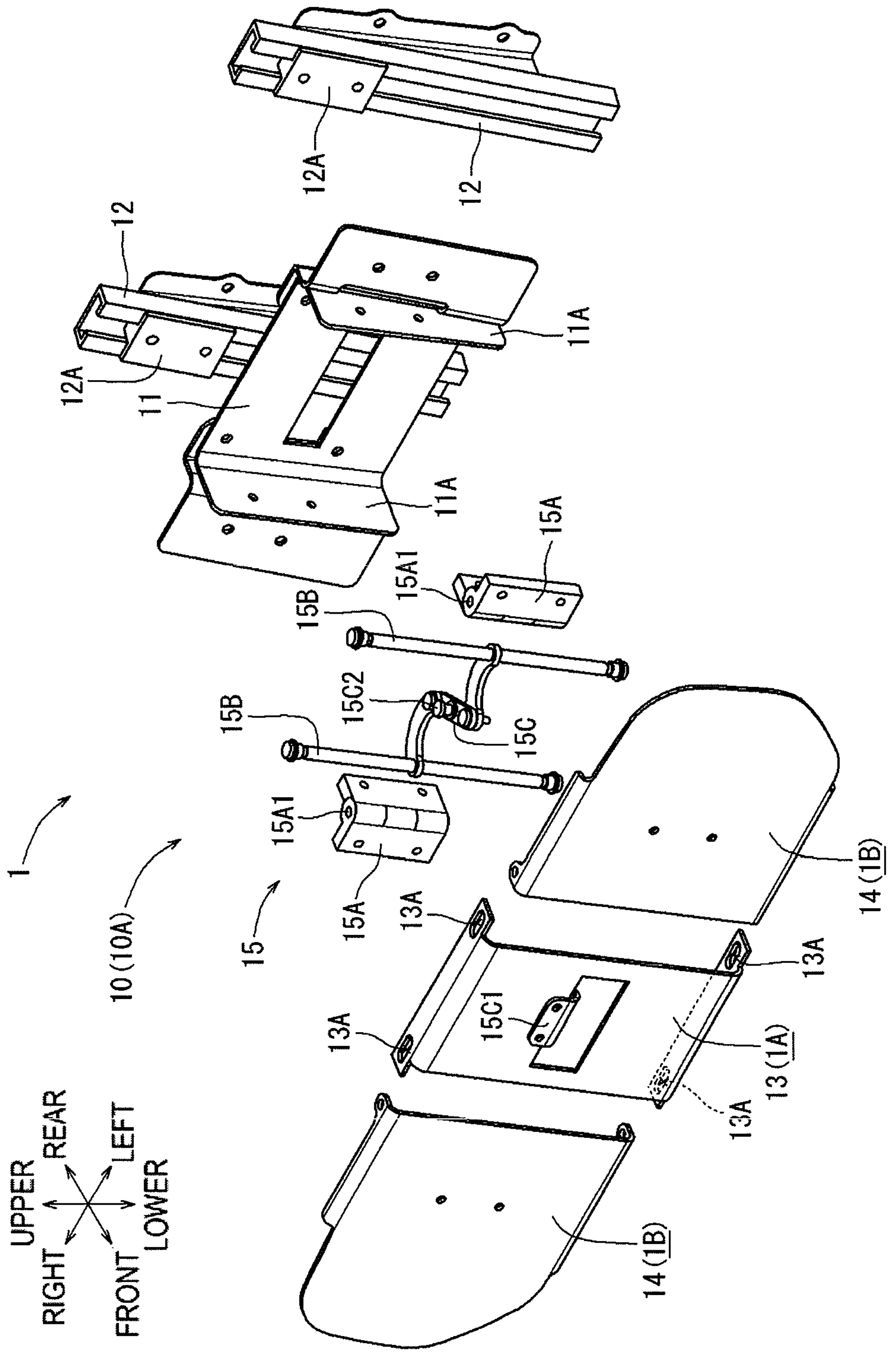
FIG. 6 is an exploded perspective view of the framework structure of the headrest.
Figure 7:
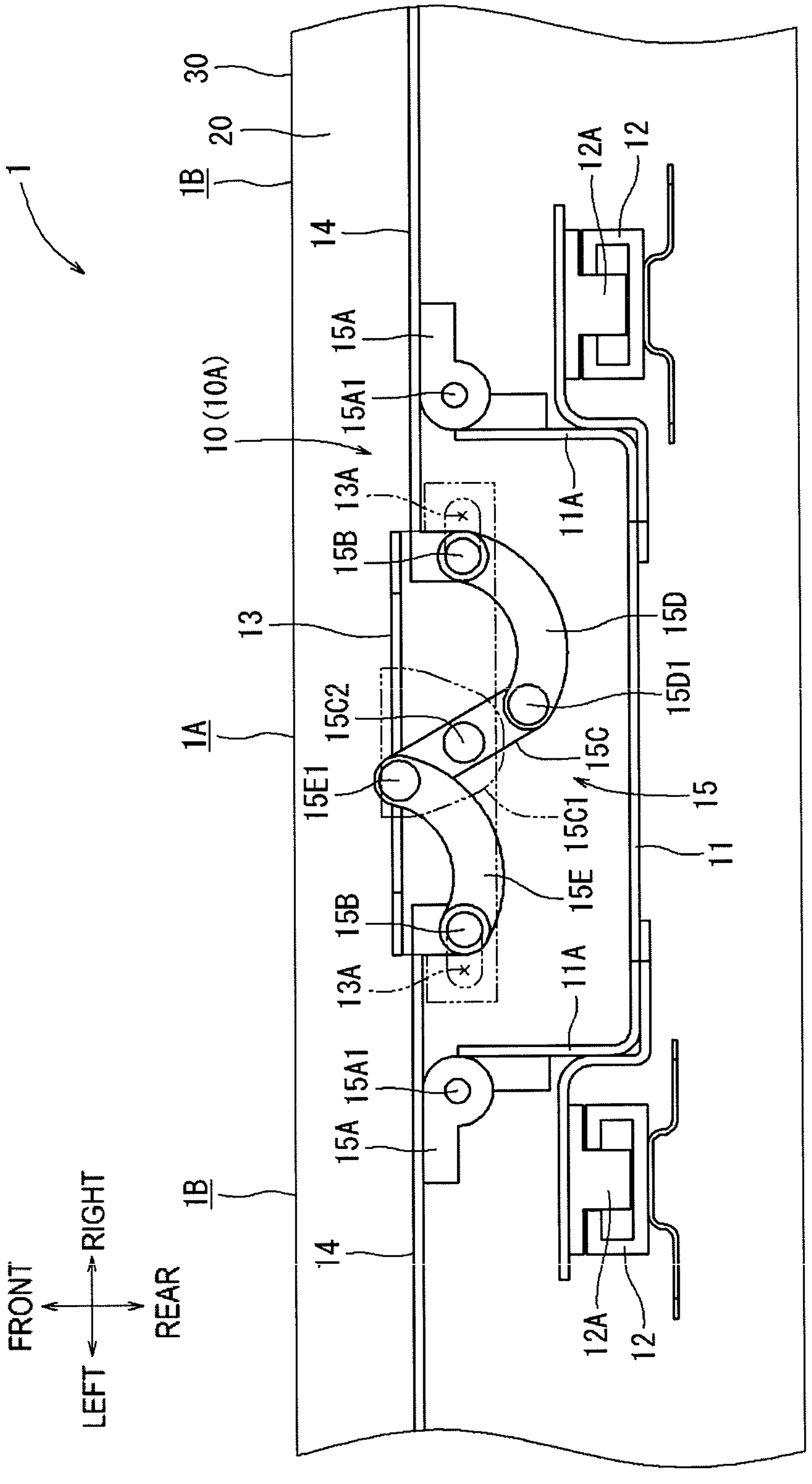
FIG. 7 is a plan view schematically showing the headrest in an initial state.

The pushing mechanism portion 15 has a pair of left and right rotation hinges 15A for rotatably hinge-coupling each side plate portion 14 to each lateral plate portion 11A of the base 11, and a pair of left and right slide shafts 15B for hinge-coupling each side plate portion 14 to the left and right side edges of the main plate portion 13 rotatably and slidably in the width direction. As shown in FIGS. 6 to 7, the pushing mechanism portion 15 further includes a seesaw link 15C rotatably hinge-coupled to a back surface of the main plate portion 13 by a coupling shaft 15C2, which directs an axis thereof in the height direction, through a bracket 15C1; a right side link 15D rotatably hinge-coupled between a front end portion of the seesaw link 15C extending towards a right rear side from the coupling shaft 15C2 and the slide shaft 15R on the right side; and a left side link 15E rotatably hinge-coupled between a front end portion of the seesaw link 15C extending towards a left front side from the coupling shaft 15C2 and the slide shaft 15B on the left side. Here, the seesaw link 15C corresponds to the "seesaw-type link" of the disclosure.

As shown in FIG. 7, the right side link 15D is in a state of being rotatably hinge-coupled to the front end portion of the seesaw link 15C extending towards the right rear side by a coupling shaft 15D1 which directs an axis thereof in the height direction. Further, the left side link 15E is in a state of being rotatably hinge-coupled to the front end portion of the seesaw link 15C extending towards the left front side by a coupling shaft 15E1 which directs an axis thereof in the height direction. In the initial state of the headrest 1, that is, when the main portion 1A and each side portion 1B are configured in a state where front surfaces thereof are substantially flush with each other, due to the main plate portion 13 and each side plate portions 14 of the internal frame 10 being similarly kept in a state where front surfaces of the main plate portion 13 and the side plate portions 14 are substantially flush with each other, the pushing mechanism portion 15 having the above configuration is brought into a state of being kept in the following form.

Figure 8:
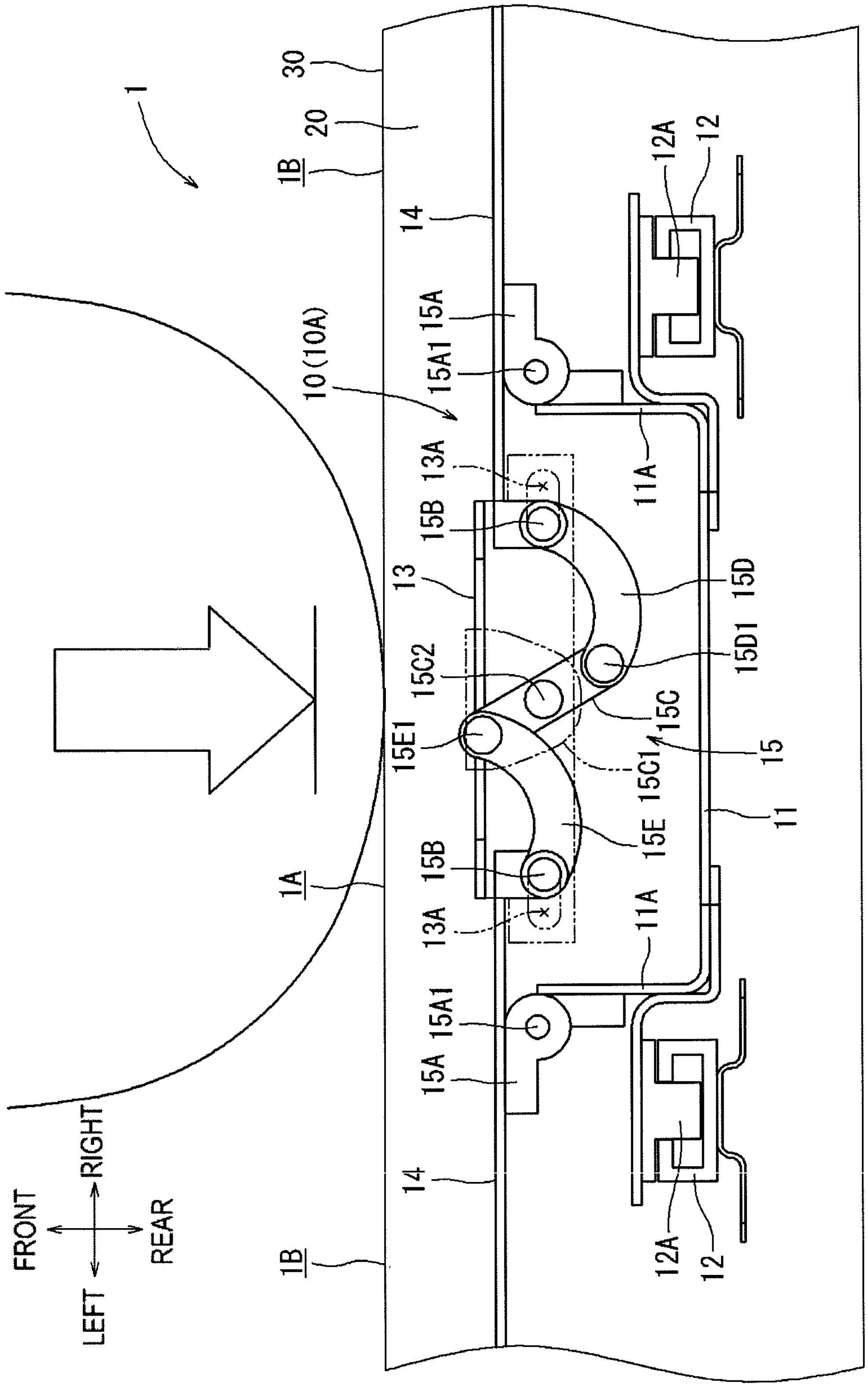
FIG. 8 is a plan view showing a state where the head abuts against the headrest in an initial state.

That is, in the initial state, the pushing mechanism portion 15 is in a posture where the seesaw link 15C is slightly directed to the left front side thereof from the front and rear direction, and each slide shaft 15B is positioned at an inner end portion in the width direction of the left and right elongated holes 13A of the main plate portion 13 via the right side link 15D and the left side link 15E which are connected to the seesaw link 15C. From the above posture, as shown in FIG. 8, when a light load is applied, such as the head of the seated person temporarily abutting against the main portion 1A of the headrest 1, pressing force towards the rear side is applied to the main plate portion 13 of the internal frame 10. However, in this case, even if the pushing force towards the rear side is applied to each side plate portion 14 from the main plate portion 13 via the slide shafts 15B of the pushing mechanism portion 15, the side plate portions 14 are difficult to be pushed and moved rearward and the head of the seated person can be supported from the rear side thereof at a relatively fixed position by the main plate portion 13 under the action of the sliding friction resistance force of each rotation hinge 15A.

Figure 9:
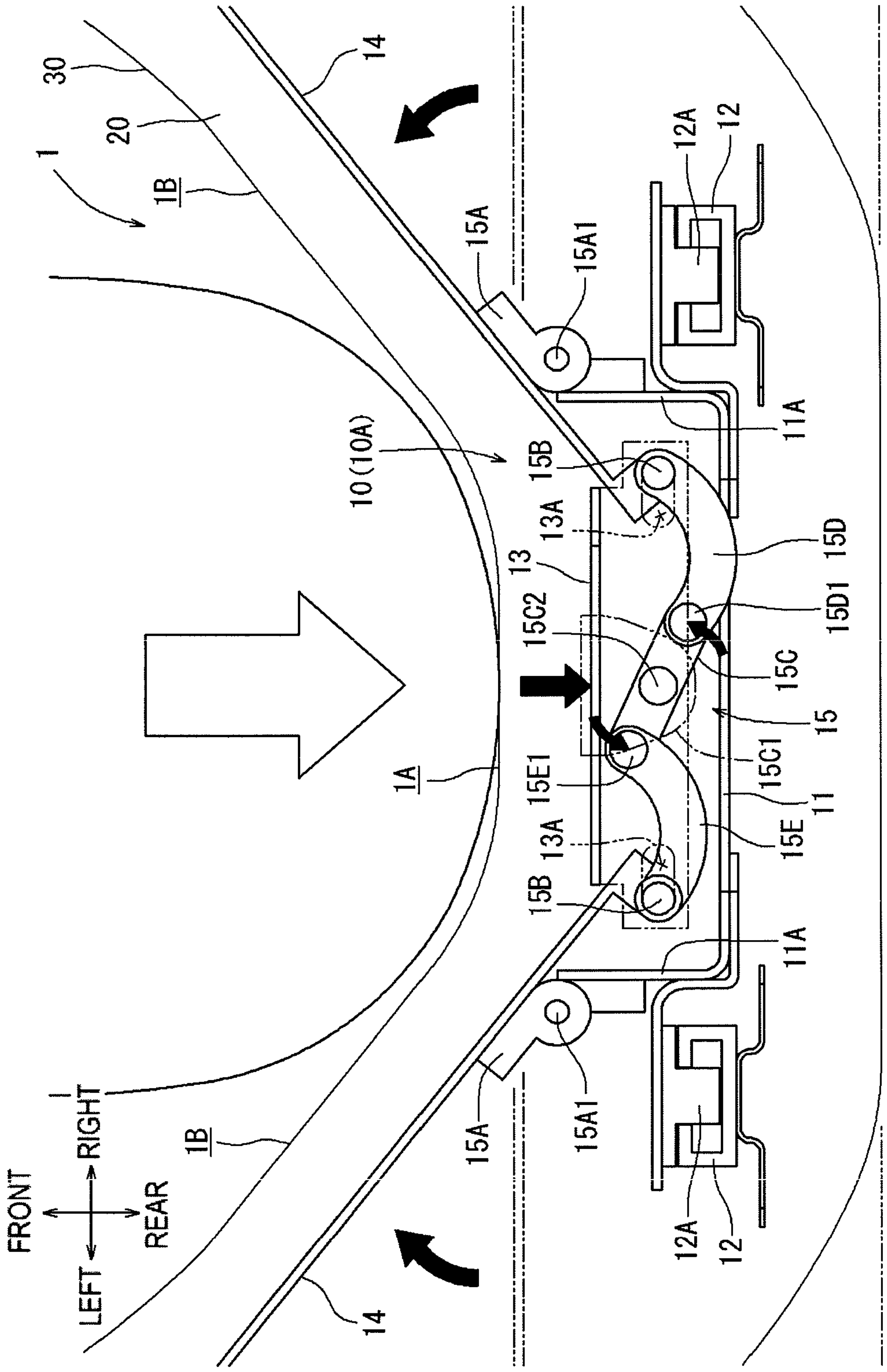
FIG. 9 is a plan view showing a state where the headrest is pushed and moved by a head load and is switched to a side support state.

However, when a relatively heavy load is applied, such as the head of the seated person continuously leaning on the main portion 1A of the headrest 1 from the front side thereof, as shown in FIG. 9, the main plate portion 13 of the internal frame 10 overcomes the sliding friction resistance force of each rotation hinge 15A of the pushing mechanism portion 15 and receives the pushing force which pushes the main plate portion 13 from the initial position towards the rear side thereof. Accordingly, each side plate portion 14 is rotated around the rotation shaft 15A1 of the rotation hinge 15A of the pushing mechanism portion 15 in a form where an outer part of each side plate portion 14 protrudes forward symmetrically under the action of the rearward pressing force applied from the main plate portion 13 to each side plate portion 14 via each slide shaft 15B of the pushing mechanism portion 15.

Then, along with the rotation of each side plate portion 14, each slide shaft 15B is pushed and moved outward in the width direction in the right and left elongated holes 13A of the main plate portion 13, and thus the pushing mechanism portion 15 moves to accept retraction movement of the main plate portion 13 towards the rear side while gradually rotating the seesaw link 15C in a counterclockwise direction as shown in FIG. 9 via the right side link 15D and the left side link 15E which are connected to the slide shafts 15B.

With the above interlocking structure, a degree of freedom of each movement is restricted such that the left and right side plate portions 14 protrude forward symmetrically without variance on the left and right according to the retraction movement of the main plate portion 13. Here, the pushing mechanism portion 15, which is configured such that the seesaw link 15C and each slide shaft 15B are coupled to each other and the slide shafts 15B are coupled to each other in a state where power is capable of being transmitted in the width direction via the seesaw link 15C, corresponds to the "coupling mechanism portion" of the disclosure.

The pushing mechanism portion 15 is pushed and moved by a moving amount corresponding to the moving amount by which the main portion 1A of the headrest 1 is pushed rearward by the head of the seated person, and is maximally pushed and moved to the retraction position (a position in the state shown in FIG. 9) where each slide shaft 15B is abutted against an outer end portion in the width direction of each elongated hole 13A and are locked therein. With the above operation, the head of the seated person is supported from the rear side thereof at the position where the main portion 1A is pushed to the retraction position from the initial position, and each side portion 1B of the headrest 1 is switched to a obliquely protruding state (side support state) where the head of the seated person can be supported laterally.

In this case, each side portion 1B of the headrest 1 is in a state where the side plate portion 14 of the internal frame 10 is pushed forward while sliding outward in the width direction in each elongated hole 13A with respect to the main plate portion 13, and thus, even if the side portions 1B are bent in a form of being raised forward with respect to the main portion 1A, an interior corner space between the side portion 1B and the main portion 1A is expanded in the width direction, so that the internal pad 20 between the side portion 1B and the main portion 1A is difficult to be crushed. Therefore, it is possible to switch each side portion 1B of the headrest 1 to the side support state with good appearance without causing wrinkles and floats between the main portion 1A and each side portion 1B.

Each side portion 1B switched to the side support state can exert force to support the head of the seated person laterally by the sliding frictional resistance force of each rotation hinge 15A for supporting the side portions 1B. After the head of the seated person is spaced from the head-rest state, the headrest 1 can be returned to a state in the initial position by pushing and moving each side portion 1B to rotate rearward by manual operation.

Summary

In summary, the headrest 1 of the embodiment has the following configuration. That is, a vehicle headrest (headrest 1) includes a main portion (main portion 1A (main plate portion 13)) including a central part of a front surface of a headrest and at least one side portion (side portion 1B (side plate portion 14)) including a side part of the front surface of the headrest. The vehicle headrest (headrest 1) includes a base (base 11) configured to support the main portion (main portion 1A (main plate portion 13)). The vehicle headrest (headrest 1) includes a pressure receiving operation mechanism (pressure receiving operation mechanism 10A) configured to operate so as to push the main portion (main portion 1A (main plate portion 13)) rearward from an initial position to a retraction position with respect to the base (base 11) in response to load input by a head of a seated person which leans on the main portion (main portion 1A (main plate portion 13)) from a front side thereof. The pressure receiving operation mechanism (pressure receiving operation mechanism 10A) includes a pushing mechanism portion (pushing mechanism portion 15) configured to push the at least one side portion (side portion 1B (side plate portion 14)) from an initial position to a side support position with respect to the base (base 11) according to a moving amount of the main portion (main portion 1A (main plate portion 13)) being pushed to the retraction position. The side support position is a position at which the head of the seated person is capable of being supported by the at least one side portion (side portion 1B (side plate portion 14)) from a lateral side thereof.

With such a configuration, the main portion (main portion 1A (main plate portion 13)) is pushed to the retraction position, and the side portion (side portion 1B (side plate portion 14)) is pushed to the side support position at which the head of the seated person is capable of being supported from the lateral side thereof by the pressure receiving operation mechanism (pressure receiving operation mechanism 10A) in response to load input by the head of the seated person which leans on the main portion (main portion 1A (main plate portion 13)) from the front side thereof. Therefore, it is possible to provide the side support portion which can be easily switched to a state where the head of the seated person can be supported from the lateral side thereof by leaning the head of the seated person on the vehicle headrest (headrest 1), without using special power means.

Further, the pushing mechanism portion (pushing mechanism portion 15) includes a hinge-coupling portion (hinge-coupling portions 15A) coupling the at least one side portion (side portion 1B (side plate portion 14)) to the base (base 11) in a state where the at least one side portion (side portion 1B (side plate portion 14)) is capable of being rotated around a rotation shaft (rotation shaft 15A1) extending in a height direction, and a slide coupling portion (coupling portion between elongated hole 13A slide shaft 15B) coupling a part of the at least one side portion (side portion 1B (side plate portion 14)) located in a region inner, in a width direction, than the rotation shaft (rotation shaft 15A1) to the main portion (main portion 1A (main plate portion 13)) in a state where the at least one side portion (side portion 1B (side plate portion 14)) is capable of being slid in the width direction, and with the moving of the main portion (main portion 1A (main plate portion 13)) to the retraction position, the at least one side portion (side portion 1B (side plate portion 14)) is pushed rearward at the slide coupling portion (coupling portion between elongated hole 13A and slide shaft 15B) and the at least one side portion (side portion 1B (side plate portion 14)) is slid outward in the width direction with respect to the main portion (main portion 1A (main plate portion 13)) while being rotated towards the side support position around the rotation shaft (rotation shaft 15A1).

With such a configuration, even if the side portion (side portion 1B (side plate portion 14)) is rotated to the side support position around a portion (slide coupling portion (coupling portion between elongated hole 13A and slide shaft 15B)) coupled with the main portion (main portion 1A (main plate portion 13)) the interior the interior corner space can be expanded without causing a cushion members (pad 20) such as a pad, which is disposed at a corner part of the main portion (main portion 1A (main plate portion 13)) and the side portion (side portion 1B (side plate portion 14)) narrowed by the rotation, from being strongly compressed. Therefore, it is possible to push the side portion (side portion 1B (side plate portion 14)) to the side support position without causing defects such as wrinkles, or floats.

Also, the side portion (side portion 1B (side plate portion 14)) includes a first side portion (side portion 1B (side plate portion 14)) and a second side portion (side portion 1B (side plate portion 14)) which are provided on left and right sides of the main portion (main portion 1A (main plate portion 13)), respectively. The slide coupling portion is configured such that a first slide shaft (slide shaft 15B) and a second slide shaft (slide shaft 15B) which extend in the height direction and are coupled to the first side portion (side portion 1B (side plate portion 14)) and the second side portion (side portion 1B (side plate portion 14)), respectively, are capable of sliding in the width direction and axially rotating in a first elongated hole (elongated hole 13A) and a second elongated hole (elongated hole 13A), respectively. The first elongated hole (elongated hole 13A) and the second elongated hole (elongated hole 13A) extend in the width direction and are formed in symmetrical positions of the main portion (main portion 1A (main plate portion 13)). The pressure receiving operation mechanism (pressure receiving operation mechanism 10A) further includes a coupling mechanism portion (pushing mechanism portion 15) in which a seesaw-type link (seesaw link 15C) provided at a central part of the main portion (main portion 1A (main plate portion 13)) is coupled with the first slide shaft (slide shaft 15B) and the second slide shaft (slide shaft 15B). The first slide shaft (slide shaft 15B) and the second slide shaft (slide shaft 15B) are coupled with each other in a state where power is capable of being transmitted to each other in the width direction via the seesaw-type link (seesaw link 15C).

With such a configuration, fluttering of the first side portion (side portion 1B (side plate portion 14)) and the second side portion (side portion 1B (side plate portion 14)) with respect to the main portion (main portion 1A (main plate portion 13)) can be suppressed by the coupling mechanism portion (pushing mechanism portion 15). Therefore, it is possible to more stably push the first side portion (side portion 1B (side plate portion 14)) and the second side portion (side portion 1B (side plate portion 14)) to a position corresponding to a moving amount of the main portion (main portion 1A (main plate portion 13)) being pushed and moved. Also, it is possible to perform arrangements such that the first side portion (side portion 1B (side plate portion 14)) and the second side portion (side portion 1B (side plate portion 14)) are pushed out symmetrically with respect to each other, or when forcible displacement force is applied to one of the side portions (side portion 1B (side plate portion 14)), the force is transmitted to the other side portion (side portion 1B (side plate portion 14)) and the other side portion (side portion 1B (side plate portion 14)) is also displaced.

<Other Embodiments>

Modes for carrying out the disclosure has been described with one embodiment, but the disclosure can be carried out in various modes other than the above embodiment. For example, the vehicle headrest of the disclosure can be applied to not only a seat of an automobile, but also to seats for cars other than automobiles such as trains, and seats provided for other vehicles such as aircrafts and ships. Also, the vehicle headrest may be used as a so-called neckrest for supporting a neck of a seated person in addition to the headrest for supporting the head of a seated person. Also, the side portion may be configured to be provided on any one side of right and left sides of the main portion, rather than on both left and right sides thereof.

Also, as far as the pushing mechanism portion is configured so as to push the side portions forward from the initial position to the side support position, where the head of the seated person can be supported laterally, with respect to the base according to the moving amount of the main portion being pushed rearward, it is not always necessary to link-couple the main portion and the side portions with each other. Also, the pushing mechanism portion may be configured such that the side portions are pushed forward to a side support position, where the head of the seated person can be supported laterally, with respect to the base with forward linear movement instead of rotation movement according to a moving amount of the main portion being pushed to the retraction position. Also, the pressure receiving operation mechanism may be configured to use a spring and keep the headrest at the initial position by the urging force of the spring instead of the sliding friction resistance force of the hinge-coupling portion.

What is claimed is:

1. A vehicle headrest comprising:

a main portion including a main plate portion and a central part of a front surface of the headrest;

at least one side portion including a side part of the front surface of the headrest;

a base plate hinge-coupled to the at least one side portion and configured to support the main plate portion; and a pressure receiving operation mechanism configured to operate so as to push the main plate portion rearward from an initial position to a retraction position with respect to the base plate in response to a load leaning on the main plate portion from a front side thereof, wherein the pressure receiving operation mechanism includes a pushing mechanism portion configured to push the at least one side portion forward from an initial position to a side support position with respect to the base plate according to a moving amount of the main plate portion being pushed to the retraction position, the side support position being a position at which the load is supported by the at least one side portion from a lateral side thereof.

2. The vehicle headrest according to claim 1, wherein the pushing mechanism portion includes:

a hinge-coupling portion coupling the at least one side portion to the base plate in a state where the at least one side portion is capable of being rotated around a rotation shaft of the hinge-coupling portion extending in a height direction of the headrest; and a slide coupling portion coupling a part of the at least one side portion located in a region that is more inward, in a width direction of the headrest, than the rotation shaft is to the main plate portion in a state where the at least one side portion is slidable in the width direction, and wherein, with the pushing of the main plate portion to the retraction position, the at least one side portion is pushed rearward at the slide coupling portion and the at least one side portion is slid outward in the width direction with respect to the main plate portion while being rotated towards the side support position around the rotation shaft.

3. The vehicle headrest according to claim 2, wherein the side portion includes a first side portion and a second side portion which are provided on left and right sides of the main plate portion, respectively, wherein the slide coupling portion is configured such that a first slide shaft and a second slide shaft which extend in the height direction and are coupled to the first side portion and the second side portion, respectively, are slidable in the width direction and axially rotatable in a first elongated hole and a second elongated hole, respectively, the first elongated hole and the second elongated hole extending in the width direction and being formed in the main plate portion at symmetrical positions relative to the central part of the front surface of the headrest, and wherein the pressure receiving operation mechanism further includes a coupling mechanism portion in which a link that is configured to pivotally swing about a rotation shaft thereof is provided at a central part of the main plate portion and coupled with the first slide shaft and the second slide shaft, the first slide shaft and the second slide shaft being coupled with each other in a state where power is transmissible between each other in the width direction via the link.

4. The vehicle headrest according to claim 1, wherein the at least one side portion includes a side plate portion.

5. The vehicle headrest according to claim 1, wherein the base plate has a recess opened toward the front surface of the headrest, and in the initial position, the central part of the front surface of the headrest is disposed outside of the recess, and in the retraction position, the central part of the front surface of the headrest is disposed within the recess.

6. The vehicle headrest according to claim 1, wherein the hinge-coupling portion couples a rear side surface of the at least one side portion to a lateral plate portion of the base plate, and a sliding friction resistance force acting between the hinge-coupling portion and the lateral plate portion restricts rotation of the at least one side portion in a front-rear direction of the vehicle headrest.

7. The vehicle headrest according to claim 1, wherein in the initial position, the main plate portion and the at least one side portion are substantially flush with each other along their respective front side surfaces.

8. The vehicle headrest according to claim 3, wherein the link is coupled to the first slide shaft via a first side link and to the second slide shaft via a second side link, and the first side link and the second side link are coupled to the link such that the link moves the first side link and second side link in a seesaw manner to transmit power between the initial position and the retraction position.

* * * * *